(12) United States Patent
Li et al.

(10) Patent No.: US 11,151,018 B2
(45) Date of Patent: Oct. 19, 2021

(54) METHOD AND APPARATUS FOR TESTING A CODE FILE

(71) Applicant: Baidu USA LLC, Sunnyvale, CA (US)

(72) Inventors: Peng Li, Sunnyvale, CA (US); Yaohui Chen, Sunnyvale, CA (US); Tao Wei, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 67 days.

(21) Appl. No.: 15/953,020

(22) Filed: Apr. 13, 2018

(65) Prior Publication Data

US 2019/0317882 A1  Oct. 17, 2019

(51) Int. Cl.
*G06F 9/44* (2018.01)
*G06F 11/36* (2006.01)

(52) U.S. Cl.
CPC ...... *G06F 11/3644* (2013.01); *G06F 11/3684* (2013.01); *G06F 11/3688* (2013.01)

(58) Field of Classification Search
CPC ............ G06F 11/3644; G06F 11/3688; G06F 11/3684
See application file for complete search history.

(56) References Cited

U.S. PATENT DOCUMENTS

| | | | | |
|---|---|---|---|---|
| 5,265,254 A * | 11/1993 | Blasciak | ............. | G06F 11/3466 713/502 |
| 5,359,546 A * | 10/1994 | Hayes | ................. | G06F 11/3688 702/123 |
| 6,311,327 B1 * | 10/2001 | O'Brien | ............... | G06F 11/3466 714/35 |
| 7,730,452 B1 * | 6/2010 | Li | ........................... | G06F 9/449 717/124 |
| 10,394,694 B2 * | 8/2019 | Phan | .................... | G06F 11/3664 |
| 2003/0084432 A1 * | 5/2003 | Kobayashi | .............. | G06F 8/423 717/146 |
| 2003/0120776 A1 * | 6/2003 | Avvari | .................. | G06F 9/5055 709/225 |
| 2008/0005719 A1 * | 1/2008 | Morris | ...................... | G06F 8/41 717/100 |
| 2014/0109051 A1 * | 4/2014 | Mcdonald | ........... | G06F 11/3688 717/124 |
| 2015/0339217 A1 * | 11/2015 | Avgerinos | ........... | G06F 11/3608 717/132 |
| 2015/0356294 A1 * | 12/2015 | Tan | ......................... | G06F 8/427 726/22 |
| 2016/0335172 A1 * | 11/2016 | Smith | .................. | G06F 11/3644 |
| 2018/0067845 A1 * | 3/2018 | Costello, Jr. | ........ | G06F 11/3688 |

* cited by examiner

*Primary Examiner* — Lewis A Bullock, Jr.
*Assistant Examiner* — Mohammad H Kabir
(74) *Attorney, Agent, or Firm* — Seed IP Law Group LLP

(57) ABSTRACT

Embodiments of the present disclosure disclose a method and an apparatus for testing a code file. A preferred embodiment of the method comprises: compiling a to-be-tested code file to obtain an intermediate code file; instrumenting a code block identifier of each code block in the intermediate code file to the intermediate code file; determining an identifier of a jump relationship between two code blocks that have the jump relationship in the intermediate code file; performing dynamic testing to the instrumented intermediate code file based on respective code block identifiers and respective identifiers of jump relationships. This embodiment enhances bug detection capabilities for testing a code file.

11 Claims, 6 Drawing Sheets

```
1  %10 = load i32* %6, align 4, !dbg !168
2  %11 = tail call { i32, i1 } @llvm.sadd.with.overflow.i32(i32 %10, i32 1),
!dbg !168
3  %12 = extractvalue { i32, i1 } %11, 0, !dbg !168
4  %13 = extractvalue { i32, i1 } %11, 1, !dbg !168
5  br i1 %13, label %handler.add_overflow, label %cont6, !dbg !168, !prof
!174, !nosanitize !2, !afl_edge_sanitizer !2
6
7  handler.add_overflow:                          ; preds = %cont5
8  %14 = zext i32 %10 to i64, !dbg !175, !nosanitize !2
9  tail call void @__ubsan_handle_add_overflow(i8* bitcast ({ { [12 x i8]*,
i32, i32 }, { i16, i16, [6 x i8] }* }* @5 to i8*), i64 %14, i64 1) #4, !dbg !175
, !nosanitize !2
10  br label %cont6, !dbg !175, !nosanitize !2
11
12 cont6:  ; preds = %handler.add_overflow, %cont5
```

Fig. 4

```
1  %10 = load i32* %6, align 4, !dbg !168, !afl_cur_loc !173
2  %11 = tail call { i32, i1 } @llvm.sadd.with.overflow.i32(i32 %10, i32 1),
!dbg !168
3  %12 = extractvalue { i32, i1 } %11, 0, !dbg !168
4  %13 = extractvalue { i32, i1 } %11, 1, !dbg !168
5  br i1 %13, label %handler.add_overflow, label %cont6, !dbg !168, !prof
!174, !nosanitize !2, !afl_edge_sanitizer !2
6
7  handler.add_overflow:                    ; preds = %cont5
8  %14 = zext i32 %10 to i64, !dbg !175, !nosanitize !2, !afl_cur_loc !178
9  tail call void @__ubsan_handle_add_overflow(i8* bitcast ({ { [12 x i8]*,
i32, i32 }, { i16, i16, [6 x i8] }* }* @5 to i8*), i64 %14, i64 1) #4, !dbg !175
, !nosanitize !2
10  br label %cont6, !dbg !175, !nosanitize !2
11
12 cont6:  ; preds = %handler.add_overflow, %cont5
```

Fig. 5

METHOD AND APPARATUS FOR TESTING A CODE FILE

TECHNICAL FIELD

Embodiments of the present disclosure relate to the field of computer technologies, and more particularly relate to a method and an apparatus for testing a code file.

BACKGROUND

Dynamic software testing refers to a process of actually running a to-be-tested program, providing a corresponding test case, and vetting the to-be-tested code file by examining a programmed dynamic behavior or judging a correctness of a running result. The dynamic software testing mainly falls into two categories: grey box fuzz testing and concolic execution.

The grey box fuzz testing refers to dynamically running a to-be-tested program with randomly generated mass data as test cases (inputs) for the to-be-tested program to detect bugs of the to-be-tested program.

The concolic execution attempts to detect a new code block by repetitively executing the to-be-tested program and automatically generating test cases (inputs) that cause the to-be-tested program to be executed at a different path at each time. The concolic execution achieves state-space coverage of the whole program by a full-path search, thereby comprehensively vetting the to-be-tested program.

However, most of the existing dynamic software testing are based on performing dynamic testing on an intermediate code file or an object file obtained from the compiling a code file, which can not get to know what code were accessed during the testing process, and a location of the bugs can not be specifically located.

SUMMARY

Embodiments of the present disclosure provide a method and an apparatus for testing a code file.

In a first aspect, an embodiment of the present disclosure provides a method for testing a code file, the method comprising: compiling a to-be-tested code file to obtain an intermediate code file; instrumenting a first instrumentation content to the intermediate code file, wherein the first instrumentation content includes a code block identifier of each code block in the intermediate code file; determining an identifier of a jump relationship between two code blocks that have the jump relationship in the intermediate code file based on respective code block identifiers in the intermediate code file; and performing dynamic testing to the instrumented intermediate code file based on respective code block identifiers and respective identifiers of jump relationships, to generate a testing result of testing the to-be-tested code file.

In some embodiments, wherein the step of performing dynamic testing to the instrumented intermediate code file based on respective code block identifiers and respective identifiers of jump relationships, to generate a testing result of testing the to-be-tested code file, comprises: compiling the instrumented intermediate code file to obtain an object file corresponding to the instrumented intermediate code file; alternately performing grey box fuzz testing to the object file and performing concolic execution to the instrumented intermediate code file based on respective code block identifiers and respective identifiers of jump relationships, to generate a testing result of testing the to-be-tested code file.

In some embodiments, wherein the step of performing dynamic testing to the instrumented intermediate code file based on respective code block identifiers and respective identifiers of jump relationships, to generate a testing result of testing the to-be-tested code file, comprises: compiling the instrumented intermediate code file to obtain an object file corresponding to the instrumented intermediate code file; performing grey box fuzz testing to the object file based on respective code block identifiers and respective identifiers of jump relationships, to generate a testing result of testing the to-be-tested code file.

In some embodiments, wherein the step of performing dynamic testing to the instrumented intermediate code file based on respective code block identifiers and respective identifiers of jump relationships, to generate a testing result of testing the to-be-tested code file, comprises: performing concolic execution to the instrumented intermediate code file based on respective code block identifiers and respective identifiers of jump relationships, to generate a testing result of testing the to-be-tested code file.

In some embodiments, wherein the step of compiling a to-be-tested code file to obtain an intermediate code file, comprises: compiling a to-be-tested code file to obtain an intermediate code file including a second instrumentation content, wherein the second instrumentation content includes an error detection statement and a location labeled statement for indicating a location of the error detection statement.

In some embodiments, the step of alternately performing grey box fuzz testing to the object file and performing concolic execution to the instrumented intermediate code file based on respective code block identifiers and respective identifiers of jump relationships, to generate a testing result of testing the to-be-tested code file, comprises: generating a set of test cases, and creating an empty set of testing process information; and executing a first testing operation that comprises: performing, with a test case in the set of test cases as input, grey box fuzz testing to the object file in response to determining that a preset switch condition is not satisfied; generating testing process information based on the test case used in the grey box fuzz testing process, the identifiers of the jump relationships accessed in the grey box fuzz testing process, and the error access identifier corresponding to the grey box fuzz testing process, wherein the error access identifier corresponding to the grey box fuzz testing process is configured for characterizing whether the grey box fuzz testing process has accessed the error detection statement; and adding the testing process information as generated to the set of testing process information.

In some embodiments, the first testing operation further comprises: deleting the test case used in the grey box fuzz testing process from the set of test cases.

In some embodiments, the first testing operation further comprises: in response to determining that the preset switch condition is satisfied, performing a second testing operation that comprises: generating a set of candidate test cases using a candidate test case, wherein the candidate test case refers to a test case in a testing process information in the set of testing process information, wherein, the error access identifier of the testing process information is yes and/or the identifiers of the jump relationships accessed of the testing process information is not empty; performing, using the candidate test case in the set of candidate test cases, concolic execution to the instrumented intermediate code file, to generate a complementary test case that an execution path of the complementary test case is complementary to an execution path of the inputted candidate test case; adding the complementary test case as generated to the set of test cases; and continuing executing the first testing operation.

In some embodiments, the first testing operation further comprises: taking a result of performing grey box fuzz testing to the object file as a testing result of testing the to-be-tested code file in response to determining that a preset end condition is satisfied.

In some embodiments, the second testing operation further comprises: before continuing executing the first testing operation, deleting the candidate test case used during the concolic execution from the set of candidate test cases.

In a second aspect, an embodiment of the present disclosure provides an electronic device, the electronic device comprising: an interface; a memory on which a computer program is stored; and one or more processors operably coupled to the interface and the memory, wherein the one or more processors function to: compile a to-be-tested code file to obtain an intermediate code file; instrument a first instrumentation content to the intermediate code file, wherein the first instrumentation content includes a code block identifier of each code block in the intermediate code file; determine an identifier of a jump relationship between two code blocks that have the jump relationship in the intermediate code file based on respective code block identifiers in the intermediate code file; and perform dynamic testing to the instrumented intermediate code file based on respective code block identifiers and respective identifiers of jump relationships, to generate a testing result of testing the to-be-tested code file.

In a third aspect, an embodiment of the present disclosure provides a computer-readable medium on which a computer program is stored, wherein the computer program, when being executed by or more processors, cause the one or more processors to: compile a to-be-tested code file to obtain an intermediate code file; instrument a first instrumentation content to the intermediate code file, wherein the first instrumentation content includes a code block identifier of each code block in the intermediate code file; determine an identifier of a jump relationship between two code blocks that have the jump relationship in the intermediate code file based on respective code block identifiers in the intermediate code file; and perform dynamic testing to the instrumented intermediate code file based on respective code block identifiers and respective identifiers of jump relationships, to generate a testing result of testing the to-be-tested code file.

By compiling and instrumenting the to-be-tested code file, the method and apparatus for testing a code file provided by the embodiments of the present disclosure make which code blocks and which jump paths each test case will access explicitly known during the process of performing dynamic testing to the to-be-tested code file, thereby enhances bug detection capabilities.

BRIEF DESCRIPTION OF THE DRAWINGS

Other features, objectives and advantages of the present disclosure will become more apparent through reading the detailed description of non-limiting embodiments with reference to the accompanying drawings.

FIG. 4 is a schematic diagram of an intermediate code file including a second instrumentation content according to the present disclosure;

FIG. 5 is a schematic diagram of an intermediate code file including a first instrumentation content and a second instrumentation content according to the present disclosure;

DETAILED DESCRIPTION OF THE PREFERRED EMBODIMENTS

Hereinafter, the present disclosure will be described in further detail with reference to the accompanying drawings and the embodiments. It will be appreciated that the preferred embodiments described herein are only for illustration, rather than limiting the present disclosure. In addition, it should also be noted that for the ease of description, the drawings only illustrate those parts related to the present disclosure.

It needs to be noted that without conflicts, the embodiments in the present disclosure and the features in the embodiments may be combined with each other. Hereinafter, the present disclosure will be illustrated in detail with reference to the accompanying drawings in conjunction with the embodiments.

Figure 1:
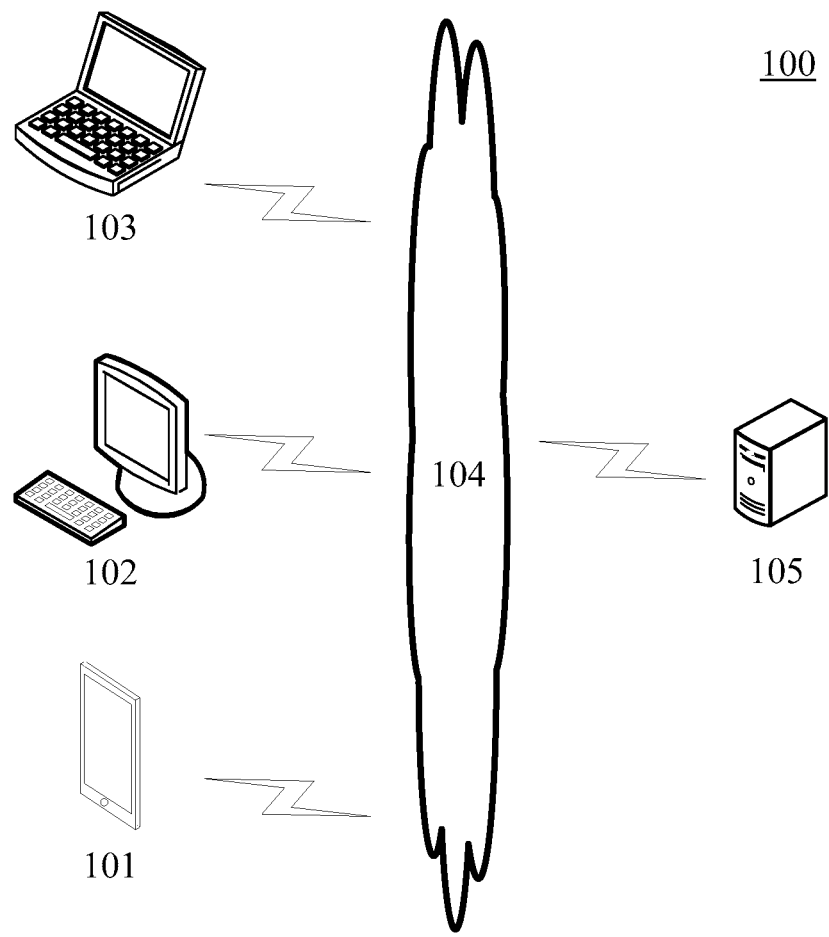
FIG. 1 is an exemplary system architecture diagram in which the present disclosure may be applied.

FIG. 1 illustrates an exemplary system architecture 100 that may apply embodiments of the method for testing a code file or the apparatus for testing a code file according to the present disclosure.

As shown in FIG. 1, the system 100 may comprise terminal devices 101, 102, 103, a network 104 and a server 105. The network 104 is configured as a medium for providing a communication link between the terminal devices 101, 102, 103, and the server 105. The network 104 may comprise various connection types, e.g., a wired/wireless communication link or an optical fiber cable, etc.

The user may interact with the server 105 via the network 104 using the terminal devices 101, 102, 103 to receive or send messages, etc. The terminals devices 101, 102, 103 may be installed with various kinds of communication client applications, e.g., an IDE (Integrated Development Environment), a text edit application, a web browser application, a code testing application, etc.

The terminal devices 101, 102, 103 may be hardware or software. When the terminal devices 101, 102, 103 are hardware, they may be various kinds of electronic devices having a display screen, including, but not limited to, a smart mobile phone, a tablet computer, a laptop portable computer, and a desktop computer, etc. When the terminal devices 101, 102, and 103 are software, they may be installed in the electronic devices listed above. They may be implemented as a plurality of software or software modules, or as a single software or software module, which are not specifically limited here.

The server 105 may be a server that provides various services, e.g., a background server that supports the IDE displayed on the terminal devices 101, 102, and 103. The background server may process various kinds of code files stored in the terminal devices, and return processing results (e.g., testing results) to the terminal devices.

It needs to be noted that the method for testing a code file provided according to the embodiments of the present disclosure is generally executed by the server 105, and correspondingly, the apparatus for testing a code file is generally arranged in the server 105.

It needs to be noted that the server 105 may also directly store the to-be-tested code file locally, such that the server 105 may directly test the local to-be-tested code file. In this case, the exemplary system architecture 100 may preferably not include the terminal devices 101, 102, 103 or the network 104.

It needs also to be noted that the terminal devices 101, 102, 103 may also be installed with a code testing application, such that the terminal devices 101, 102, 103 may test the to-be-tested code file. In this case, the method for testing a code file may also be executed by the terminal devices 101, 102, 103; correspondingly, the apparatus for testing a code file may also be provided in the terminal devices 101, 102, 103. In this case, the exemplary system architecture 100 may preferably not include the server 105 and the network 104.

It needs to be noted that the server may be hardware or software. When the server is hardware, it may be implemented as a distributed server cluster combined by a plurality of servers, or implemented as a single server. When the server is software, it may be implemented as a plurality of software or software modules (e.g., for providing a code testing service), or implemented as a single software or software module, which is not specifically limited here.

It should be understood that the numbers of terminal devices, networks and servers in FIG. 1 are only schematic. Any numbers of terminal devices, networks and servers may be provided according to implementation needs.

Figure 2:
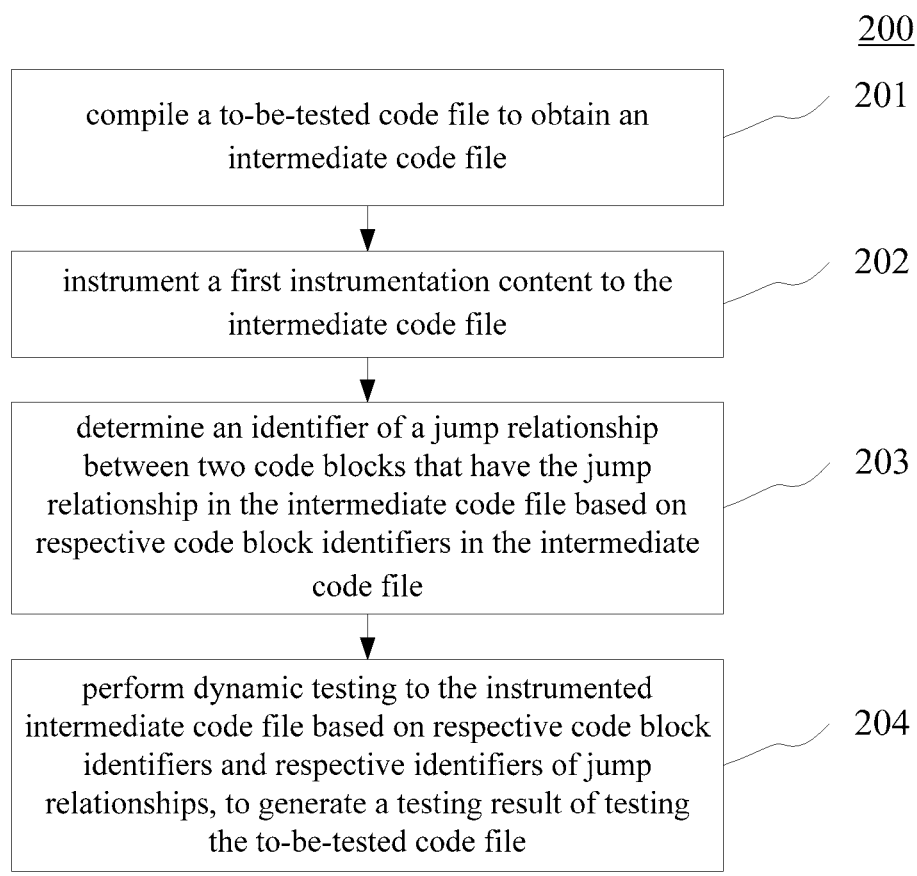
FIG. 2 is a flow chart of an embodiment of a method for testing a code file according to the present disclosure.

Continue to refer to FIG. 2, which shows a flow chart 200 of an embodiment of a method for testing a code file according to the present disclosure. The method for testing a code file comprises:

Step 201: compiling a to-be-tested code file to obtain an intermediate code file.

In this embodiment, an executing body (e.g., the server shown in FIG. 1) for testing a code file may obtain the to-be-tested code file first.

Here, the to-be-tested code file may be uploaded, in a wired or wireless connection manner, to the executing body by a terminal device (e.g., the terminal device 101, 102, 103) in communicative connection with the executing body or may be stored locally at the executing body. It needs to be noted that the wireless connection manner may include, but not limited to, 3G/4G connection, WiFi connection, Bluetooth connection, WiMax connection, Zigbee connection, UWB (Ultra-Wideband) connection, and any other existing or future developed wireless connection manners.

Then, the executing body may compile the to-be-tested code file to obtain an intermediate code file Here, the executing body may adopt a corresponding compiler frontend to compile the to-be-tested code file based on a file type of the to-be-tested code file. Here, the compiler frontend may comprise a lexical analysis section, a syntax analysis section, a semantic analysis section, and an intermediate code generation section. For example, when the to-be-tested code file is a code file written in C language or C++ language, the compiler may use Clang, such that the to-be-tested code file may be compiled by invoking the frontend of the Clang. The intermediate code file is a file formed by storing the intermediate code. The intermediate code, which represents different forms of the code in the to-be-tested code file, is referred to as an intermediate language or an intermediate representation. The intermediate code plays a role of streamlining the logic of the program structure, particularly optimizing the object code in an easier way. The complexity of the intermediate language is between a source code language and a machine language. The intermediate language has a plurality of forms, commonly the Reverse Polish Notation, AST (Abstract Syntax Tree), Four Address Code, and Three Address Code. As an example, the Three Address Code LLVM (Low Level Virtual Machine) may be used as the intermediate code.

Step 202: instrumenting a first instrumentation content to the intermediate code file.

In this embodiment, because the intermediate code file resulting from step 201 has been compiled by the compiler frontend, the intermediate code file has been segmented into at least one code block, each code block being configured for performing some specific operations. Here, the executing body (e.g., the server shown in FIG. 1) may determine a code block identifier for each code block in a plurality of implementation manners. For example, for each code block, a random number may be generated as the code block identifier of the code block. For another example, an initial number may be set, wherein the set initial number is used as the code block identifier of the first code block; then, according to appearance sequence of the subsequent code blocks, an incremental number is added for each increment, used as the code block identifier for a next code block.

Then, the executing body may instrument the code block identifier corresponding to each code block to a preset location of the code block. For example, the code block identifier of each code block may be instrumented at the rearmost of the last line of the code block immediately preceding the code block, or instrumented at a line preceding the first line of the code block or at a line next to the last line of the code block.

Step 203: determining an identifier of a jump relationship between two code blocks that have the jump relationship in the intermediate code file based on respective code block identifiers in the intermediate code file.

In this embodiment, the executing body of the method for testing a code file may parse the intermediate file first to determine two code blocks that have a jump relationship in the intermediate code file. Here, supposing that the intermediate code file includes code block A and code block B, and there is an execution path for jumping from execution of code block A and a conditional statement to execution of code block B, then it is believed that a jump relationship between code block A and code block B exists.

Then, the executing body may determine an identifier of a jump relationship between two code blocks that have the jump relationship in the intermediate code file in various kinds of implementation manners. For example, for the jump relationship of switching from execution of code block A to execution of code block B, the code block identifier of code block A is ID(A), and the code block identifier of code block B is identifier (B), where ID(A→B) represents an identifier of a jump relationship of switching from execution of code block A to execution of code block B, then ID(A→B) may be determined based on the ID(A) and the ID(B) in various implementation manners. Exemplarily, two specific implementation manners are provided below:

$$ID(A \rightarrow B) = ID(A) + ID(B) \tag{1}$$

$$ID(A \rightarrow B) = (ID(A) \gg 1) \oplus ID(B) \tag{2}$$

It may be understood that the executing body may also employ other implementation manners to determine an identifier of a jump relationship between two code blocks that have the jump relationship in the intermediate code file.

In some optional implementation manners of this embodiment, the executing body may store the code block identifiers of the two code blocks that have a jump relationship in the intermediate code file and the identifiers of the jump relationships in a corresponding manner in a preset jump relationship file. For example, continuing the example above, ID(A), ID(B), and ID(A→B) may be stored in a corresponding manner, wherein the intermediate code file has an execution path for jumping from execution of code block A and a conditional statement to execution of code block B.

Step 204: performing dynamic testing to the instrumented intermediate code file based on respective code block identifiers and respective identifiers of jump relationships, to generate a testing result of testing the to-be-tested code file.

In this embodiment, the executing body may perform dynamic testing to the instrumented intermediate code file based on respective code block identifiers and respective identifiers of jump relationships, to generate a testing result of testing the to-be-tested code file in various implementation manners.

In some optional implementation manners of this embodiment, step 204 may be executed as follows:

First, compiling the instrumented intermediate code file to obtain an object file corresponding to the instrumented intermediate code file.

Here, the executing body may adopt a compiler backend corresponding to a file type of the intermediate code file to compile the instrumented intermediate code file in step 202, thereby obtaining an object file corresponding to the instrumented intermediate code file. Here, the compiler backend may include a code optimization section and an object code generation section. For example, for the LLVM intermediate file, the instrumented intermediate file may be compiled using a Clang backend to obtain an object file corresponding to the instrumented intermediate code file.

It may be understood that the object file corresponding to the instrumented intermediate code file, which is obtained from compiling the instrumented intermediate code file, may be an executable file; or, the obtained object file becomes an executable file after being linked by a linker; in this way, the obtained object file may be used for grey box fuzz testing.

Then, performing grey box fuzz testing to the object file based on respective code block identifiers and respective identifiers of jump relationships, to generate a testing result of testing the to-be-tested code file.

Due to the instrumentation operations in the step 202, the code block identifiers are instrumented to the intermediate code file. Further, because the object file is obtained from compiling based on the instrumented intermediate code file, here, the step of performing grey box fuzz testing to the object file based on the respective code block identifiers and the respective identifiers of jump relationships may comprise: first, determining a test case for the object file; executing the object file with the determined test case as input for the object file, and recording, during the execution process, the code block identifiers of respective accessed code blocks and the identifiers of the accessed jump relationships. Finally, a testing result of the grey box fuzz testing may be generated based on the result of the execution process and the information as recorded.

In some optional implementation manners, the test case for the object file may be automatically generated in a plurality of implementation manners. For example, a new test case may be created by applying a mutation technique to an existing data sample. Or, a test case may be created from the start by modeling a target protocol or file format.

Here, a testing result of the grey box fuzz testing may include whether a bug is detected in the present testing. If the testing results show that a bug is detected, the testing results may also include code block identifiers of respective accessed code blocks and the identifiers of the accessed jump relationships, which are recorded during the execution process. In this way, a technician may further analyze the to-be-tested code file based on the obtained testing results and modify the to-be-tested code file.

In practice, the executing body may perform grey box fuzz testing to the object file with various kinds of grey box fuzz testing tool. For example, the AFL (American Fuzzy Lop) may be employed.

In some optional implementation manners of this embodiment, step 204 may be executed as follows: performing concolic execution to the instrumented intermediate code file based on respective code block identifiers and respective identifiers of jump relationships, to generate a testing result of testing the to-be-tested code file.

Here, performing concolic execution to the instrumented intermediate code file based on respective code block identifiers and respective identifiers of jump relationships, to generate a testing result of testing the to-be-tested code file may comprise: first, determining a test case for the instrumented to-be-tested code file; then, with the determined test case as the input for the instrumented to-be-tested code file, interpreting the instrumented to-be-tested code file from an entry of the instrumented to-be-tested code file; recording a path constraint condition of a current execution path during the execution process; and when an input-dependent branch statement, which causes path branching, is encountered, creating a new path having an extension direction different from that of the current path at the branch statement. Afterwards, a testing result of concolic execution may be generated based on the result of executing the current instrumented intermediate code file. Finally, a path constraint condition on the newly generated path may also be collected and solved by a constraint solving method to obtain a new test case that satisfies the path constrain condition with respect to the new path, and with the newly generated test case as input for concolic execution of the instrumented intermediate code file, a new concolic execution starts. As an example, an Boolean Stantisfibilty may be employed for constraint solving, or an SMT (Satisfiability Module Theories) may be employed for constraint solving.

In some optional implementation manners, the test case for the instrumented to-be-tested code file may be automatically generated in a plurality of implementation manners. For example, a new test case may be created by applying a mutation technique to an existing data sample. Or, a test case may be created from the start by modeling a target protocol or file format.

Here, a testing result of the concolic execution may include whether a bug is detected in the present testing. If the testing results show that a bug is detected, the testing results may also include code block identifiers of respective accessed code blocks, the identifiers of the accessed jump relationships, which are recorded during the execution process. In this way, a technician may further analyze the to-be-tested code file based on the obtained testing results and modify the to-be-tested code file.

In practice, the executing body may perform concolic execution to the instrumented intermediate code file using various kinds of concolic execution tools. For example, concolic execution may be performed to the instrumented intermediate code file using the KLEE.

In some optional implementation manners of this embodiment, step 204 may be executed as follows:

First, compiling the instrumented intermediate code file to obtain an object file corresponding to the instrumented intermediate code file.

Then, alternately performing grey box fuzz testing to the object file and performing concolic execution to the instrumented intermediate code file based on respective code block identifiers and respective identifiers of jump relationships, to generate a testing result of testing the to-be-tested code file.

Here, the executing body may alternately perform grey box fuzz testing to the object file and perform concolic execution to the instrumented intermediate code file in various implementation manners based on respective code block identifiers and respective identifiers of jump relationships, to generate a testing result of testing the to-be-tested code file.

Because the object file is obtained from compiling the instrumented intermediate code file, a same operation may be implemented by the object file and the instrumented intermediate code file. With the same test case as input, the testing result from performing grey box fuzz testing to the object file and the testing result from performing concolic execution to the instrumented intermediate code file are identical.

In this way, to augment the code coverage for testing the to-be-tested code file, a function of constraint solving after negating the condition for concolic execution may be exploited; with the test case for grey box fuzz testing of the object file as input for concolic execution of the instrumented intermediate code file, a new test case may be obtained; and then the newly obtained test case is used as the input for grey box fuzz testing of the object file or the input for concolic execution of the instrumented intermediate code file.

Here, the executing body may alternately perform grey box fuzz testing to the object file and perform concolic execution to the instrumented intermediate code file in various manners. For example, random execution may be employed to perform grey box fuzz testing to the object file and to perform concolic execution to the instrumented intermediate code file in various manners. For another example, a first preset time length and a second preset time length may be preset to switch to performing concolic execution to the instrumented intermediate code file after the duration of performing grey box fuzz testing to the object file reaches a first preset time length, and switch to performing grey box fuzz testing to the object file when the duration of performing concolic execution to the instrumented intermediate code file reaches a second preset time length.

In some optional implementation manners, the executing body may use the testing result of the grey box fuzz testing as the testing result of testing the to-be-tested code file, and the executing body may also use the testing result of concolic execution as the testing result of testing the to-be-tested code file; the execution body may also merge the testing result of the grey box fuzz testing and the testing result of the concolic execution into a testing result of testing the to-be-tested code file.

The method provided according to the foregoing embodiment of the present disclosure enhances bug detection capabilities by compiling and instrumenting the to-be-tested code file for code testing.

Figure 3:
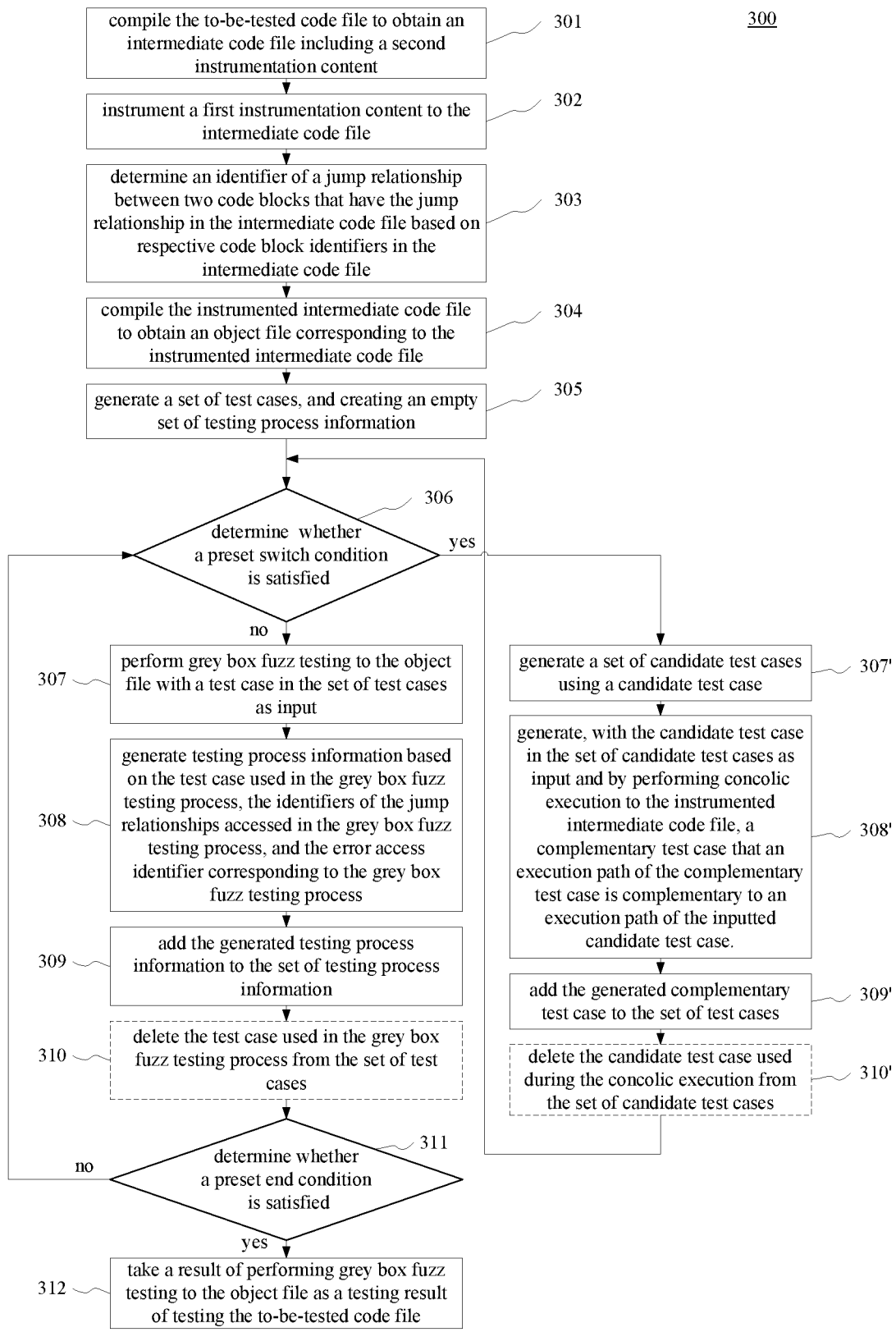
FIG. 3 is a flow chart of another embodiment of a method for testing a code file according to the present disclosure.

Continue to refer to FIG. 3, which shows a flow 300 of a further embodiment of a method for testing a code file according to the present disclosure. The flow 300 of the method for testing a code file comprises steps of:

Step 301: compiling the to-be-tested code file to obtain an intermediate code file including a second instrumentation content.

In this embodiment, an executing body (e.g., the server shown in FIG. 1) for testing a code file may obtain the to-be-tested code file first.

Then, the executing body may compile the to-be-tested code file to obtain an intermediate code file including a second instrumentation content. Particularly, the second instrumentation content may include an error detection statement and a location labeled statement for indicating a location of the error detection statement.

Here, the executing body may adopt a corresponding compiler frontend to compile the to-be-tested code file based on a file type of the to-be-tested code file and instrument the second instrumentation content to the compiled intermediate code file during the compiling process.

Here, the error detection statement may be a statement for detecting various kinds of errors. For example, the errors here may include, but not limited to, stack buffer overflow, heap buffer overflow, write memory overrun, double free within a same block, use after free, wild free, access uninitialized memory, read invalid memory, memory leak, etc.

In practice, various error detecting tools may be exploited by the executing body to implement error detection. For example, the error detection tool may be a memory checking tool in Glibc, TCMalloc (Gperftools), Address Sanitizer (ASan), etc. It may be understood that when a different error detection tool is exploited, the corresponding error detection statement in the second instrumentation content may also be different.

Here, the location labeled statement for indicating a location of the error detection statement may be provided at a preset position before or after the error detection statement, e.g., the location labeled statement for indicating a location of the error detection statement may be provided at the same line as the error detection statement but behind the error detection statement, or the location labeled statement for indicating a location of the error detection statement may be provided at the same line as the error detection statement but before the error detection statement.

It needs to be noted that instrumenting the second instrumentation content to the compiled intermediate code file is a prior art that is currently studied and applied widely, which will not be detailed here. For example, it may be implemented using an existing instrumentation tool or implemented by modifying the code of the compiler frontend.

Please refer to FIG. 4, which shows a schematic diagram of an intermediate code file including a second instrumentation content. What is shown in FIG. 4 is an LLVM language-based intermediate code file including the first instrumentation content. It is seen from FIG. 4 that the "br i1%13, label % handler.add_overflow, label % cont6, !dbg !168, !prof ! 174, !nosanitize !2" in the fifth line is an error detection statement, while "!afl_edge sanitizer !26" is a location labeled statement corresponding to the error detection statement, indicating that an error detection statement appears there.

Step 302: instrumenting a first instrumentation content to the intermediate code file.

In this embodiment, because the intermediate code file resulting from step 301 has been compiled by the compiler frontend, the intermediate code file has been segmented into at least one code block, each code block being configured for performing some specific operations. Here, the executing body (e.g., the server shown in FIG. 1) may determine a code block identifier for each code block in a plurality of implementation manners.

Then, the executing body may instrument the code block identifier corresponding to each code block to a preset location of the code block.

Please refer to FIG. 5, which shows a schematic diagram of an intermediate code file including a first instrumentation content and a second instrumentation content. What is shown in FIG. 5 is an LLVM language-based intermediate code file including the first instrumentation content and the second instrumentation content. It may be seen from FIG. 5 that the "!afl_cur_loc ! 173" in the first line is a statement including a code block identifier "173," and the "!afl_cur_loc !178" in the eighth line is a statement including a code block identifier "178," wherein the two lines of statements including the code block identifiers are used to indicate that the code block "173" lies between the second line and the eighth line, and the code block "178" starts from the ninth line.

Step 303: determining an identifier of a jump relationship between two code blocks that have the jump relationship in the intermediate code file based on respective code block identifiers in the intermediate code file.

Step 304: compiling the instrumented intermediate code file to obtain an object file corresponding to the instrumented intermediate code file.

In this embodiment, specific operations of step 303 and step 304 are substantially identical to the operations of step 203 and step 204 in the embodiment illustrated in FIG. 2.

Step 305: generating a set of test cases, and creating an empty set of testing process information.

In this embodiment, an executing body (e.g., the server shown in FIG. 1) for testing the code file may first generate a set of test cases in a plurality of implementation manners. For example, a new test case may be created by applying a mutation technique to an existing data sample. Or, a test case may be created from the start by modeling a target protocol or file format.

Then, the executing body may create a new empty set of testing process information. Specifically, the testing process information may include a test case, an identifier of a jump relationship and an error access identifier, wherein the error access identifier is configured for characterizing whether an error detection statement was accessed during the testing process.

Step 306: determining whether a preset switch condition is satisfied.

In this embodiment, the executing body may determine whether a preset switch condition is satisfied. Here, the preset switch condition may be a preset condition for switching from performing grey box fuzz testing to the object file to performing concolic execution to the instrumented intermediate code file. If it is determined that the preset switch condition is not satisfied, the flow may jump to step 307 to continue performing the grey box fuzz testing to the object file. If it is determined that the preset switch condition is satisfied, the flow may jump to step 307', switching to performing concolic execution to the instrumented intermediate code file. For example, the preset switch condition may be set as such: a duration of performing grey box fuzz testing to the object file reaches a third preset time length. For another example, the preset switch condition may be set as such: times of performing grey box fuzz testing to the object file is greater than or equal to a first preset number.

Step 307: performing grey box fuzz testing to the object file with a test case in the set of test cases as input.

In this embodiment, the executing body may perform grey box fuzz testing to the object file with a test case in the set of test cases as input if it is determined in step 306 that the preset switch condition is not satisfied. After executing step 307, the flow proceeds to step 308.

Due to the instrumentation operations in the step 301 and the step 302, the error detection statement, the location labeled statement for indicating a location of the error detection statement, and the code block identifiers, are instrumented to the intermediate code file. Further, because the object file is obtained by compiling the instrumented intermediate code file, in this embodiment, the step of performing grey box fuzz testing to the object file with the test case in the set of test cases as input may comprise: first, executing the object file with the test case in the set of test cases as input for the object file, and recording, during the execution process, the code block identifiers of respective accessed code blocks, the identifiers of the accessed jump relationships, and whether an error detection statement has been accessed. Then, a testing result of the grey box fuzz testing may be generated based on a result of the execution process and the information as recorded.

In practice, the executing body may perform grey box fuzz testing to the object file using various kinds of grey box fuzz testing tools. For example, the AFL (American Fuzzy Lop) may be employed.

In this embodiment, a testing result of the grey box fuzz testing may include whether a bug is detected in the present testing. If the testing result shows that a bug is detected, the testing result may also include code block identifiers of respective accessed code blocks, the identifiers of the accessed jump relationships, and whether an error detection statement has been accessed, which are recorded during the execution process. In this way, a technician may further analyze the to-be-tested code file based on the obtained testing result and modify the to-be-tested code file.

Step 308: generating testing process information based on the test case used in the grey box fuzz testing process, the identifiers of the jump relationships accessed in the grey box fuzz testing process, and the error access identifier corresponding to the grey box fuzz testing process.

In this embodiment, the executing body may generate the testing process information based on the test case used in the grey box fuzz testing process in step 307, the identifiers of the jump relationships accessed in the grey box fuzz testing process in step 307, and the error access identifier corresponding to the grey box fuzz testing process in step 307. Specifically, the error access identifier corresponding to the grey box fuzz testing process is configured for characterizing whether an error detection statement was accessed during the grey box fuzz testing process. After executing step 308, the flow proceeds to step 309.

Step 309: adding the generated testing process information to the set of testing process information.

In this embodiment, the executing body may add the testing process information generated in step 308 to the set of testing process information. After executing step 309, the flow proceeds to step 311.

In some optional implementation manners of this embodiment, after executing step 309, the flow may proceed to step 310, and after executing step 310, the flow proceeds to step 311.

Step 310: deleting the test case used in the grey box fuzz testing process from the set of test cases.

In this embodiment, the executing body may delete the test case used in the grey box fuzz testing process in step 307 from the set of test cases. After executing step 310, the flow proceeds to step 311.

Step 311: determining whether a preset end condition is satisfied.

In this embodiment, the executing body may determine whether a preset end condition is satisfied. Here, the preset end condition may be a preset condition for terminating the grey box fuzz testing of the object file. If it is determined that the preset end condition is satisfied, the flow may proceed to step 312. If it is determined that the preset end condition is not satisfied, the flow may return to step 306 to continue performing the grey box fuzz testing to the object file. For example, the preset end condition may be set as such: a sum of durations of performing grey box fuzz testing to the object file and performing concolic execution to the instrumented intermediate code file reaches a fourth preset time length. For another example, the preset end condition may be set as such: a sum of times of performing grey box fuzz testing to the object file and performing concolic execution to the instrumented intermediate code file is greater than or equal to a second preset number.

Step 312: taking a result of performing grey box fuzz testing to the object file as a testing result of testing the to-be-tested code file.

In this embodiment, in the case that the preset end condition is determined to be satisfied in step 311, the executing body may take a result of performing grey box fuzz testing to the object file as a testing result of testing the to-be-tested code file.

Step 307', generating a set of candidate test cases using a candidate test case.

In this embodiment, the executing body may generate a set of candidate test cases using a candidate test case if it is determined in step 306 that the preset switch condition is satisfied. Specifically, the candidate test case is a test case in a testing process information in the set of testing process information, wherein, the error access identifier of the testing process information is yes and/or the identifiers of the jump relationships accessed of the testing process information is not empty. After executing step 307', the flow proceeds to step 308'.

Step 308': generating, with the candidate test case in the set of candidate test cases as input and by performing concolic execution to the instrumented intermediate code file, a complementary test case that an execution path of the complementary test case is complementary to an execution path of the inputted candidate test case.

In this embodiment, the executing body may generate, with the candidate test case in the set of candidate test cases as input and by performing concolic execution to the instrumented intermediate code file, a complementary test case that an execution path of the complementary test case is complementary to an execution path of the inputted candidate test case. After executing step 308', the flow proceeds to step 309'.

Because the test case in the set of candidate test cases is generated with the test case in a testing process information in the set of testing process information, wherein, the error access identifier of the testing process information is yes and/or the identifiers of the jump relationships accessed of the testing process information is not empty, i.e., if the object file is subjected to grey box fuzz testing with the test case in the set of candidate test cases as input for the object file, the testing process will access the error detection statement and/or the testing process will access a conditional statement and take one branched statement thereof. The object file is obtained from compiling the instrumented intermediate code file; with the same test case as input, execution of the object file and execution of the instrumented intermediate code file will take a same path.

Therefore, to perform concolic execution to the instrumented intermediate code file with the candidate test case in the set of candidate test cases generated in step 307' as input, the execution process will access the error detection statement and/or the testing process will access a conditional statement and take one branched statement thereof during the process of concolic execution, a constraint condition during the execution process will be negated; solving the input corresponding to the negated constraint condition using the constraint solving method will result in a complementary test case complementary to the candidate test case in use.

Step 309': adding the generated complementary test case to the set of test cases.

In this embodiment, the executing body may add the complementary test case generated in step 308' to the set of test cases, such that a test case complementary to the test case that was subjected to the grey box fuzz testing may be added to the test case in the set of test cases; then, when the test case, in the set of test cases after being added with the complementary test case, is used for grey box fuzz testing, the code coverage of the grey box fuzz testing may be augmented. After executing step 309', the flow proceeds to step 306.

In some optional implementation manners of this embodiment, after executing step 309', the flow may proceed to step 310', and after executing step 310', the flow proceeds to step 306.

Step 310': deleting the candidate test case used during the concolic execution from the set of candidate test cases.

In this embodiment, the executing body may delete the candidate test case used during the concolic execution process in step 308' from the set of candidate test cases. After executing step 310', the flow proceeds to step 306.

It may be seen from FIG. 3 that compared with the embodiment corresponding to FIG. 2, the flow 300 of the method for testing a code file in this embodiment highlights that during the process of alternately performing grey box fuzz testing to the object file and performing concolic execution to the instrumented intermediate code file, the candidate test case in the test cases used during the grey box fuzz testing process is used as input for concolic execution of the instrumented intermediate code file to generate a test case complementary to the candidate test case, and then the generated complementary test case is used as input for grey box fuzz testing of the object file, which augments code coverage of the code testing process.

Figure 6:
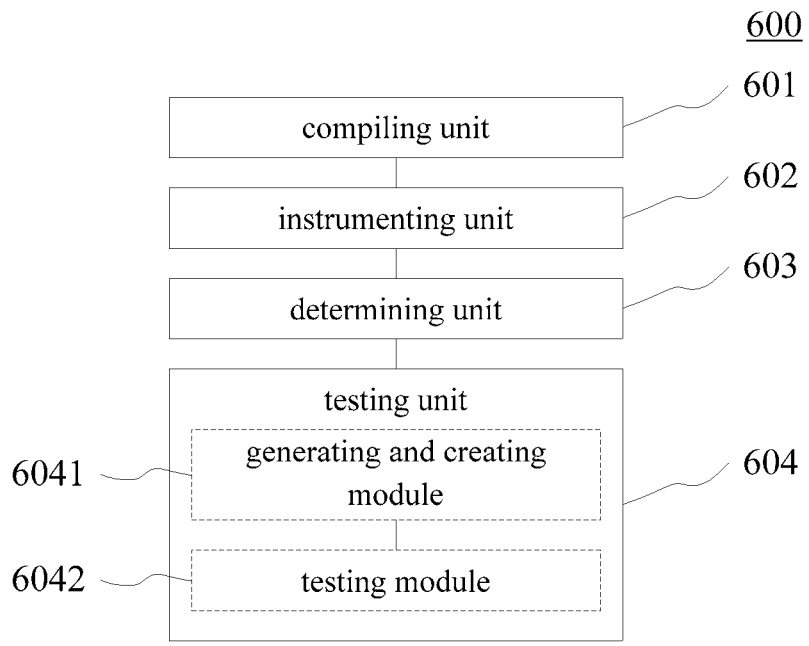
FIG. 6 is a structural schematic diagram of an embodiment of an apparatus for testing a code file according to the present disclosure.

Further refer to FIG. 6. To implement the methods shown in respective figures above, the present disclosure provides an embodiment of an apparatus for testing a code file. The apparatus embodiment corresponds to the method embodiment shown in FIG. 2. The apparatus may be specifically applied to various electronic devices.

As shown in FIG. 6, the apparatus 600 for testing a code file in this embodiment comprises: a compiling unit 601, an instrumenting unit 602, a determining unit 603, and a testing unit 604. Specifically, the compiling unit 601 is configured for compiling a to-be-tested code file to obtain an intermediate code file; the instrumenting unit 602 is configured for instrumenting a first instrumentation content to the intermediate code file, wherein the first instrumentation content includes a code block identifier of each code block in the intermediate code file; the determining unit 603 is configured for determining an identifier of a jump relationship between two code blocks that have the jump relationship in the intermediate code file based on respective code block identifiers in the intermediate code file; and the testing unit 604 is configured for performing dynamic testing to the instrumented intermediate code file based on respective code block identifiers and respective identifiers of jump relationships, to generate a testing result of testing the to-be-tested code file.

In this embodiment, specific operations of the compiling unit 601, the instrumenting unit 602, the determining unit 603, and the testing unit 604 of the apparatus 600 for testing a code file, as well as the technical effects achieved thereby, may refer to relevant depictions of step 201, step 202, step 203, and step 204 in the embodiment corresponding to FIG. 2, respectively, which thus will not be detailed here.

In some optional implementation manners of this embodiment, the testing unit 604 may further be configured for compiling the instrumented intermediate code file to obtain an object file corresponding to the instrumented intermediate code file; and alternately performing grey box fuzz testing to the object file and performing concolic execution to the instrumented intermediate code file based on respective code block identifiers and respective identifiers of jump relationships, to generate a testing result of testing the to-be-tested code file.

In some optional implementation manners of this embodiment, the testing unit 604 may further be configured for compiling the instrumented intermediate code file to obtain an object file corresponding to the instrumented intermediate code file; and performing grey box fuzz testing to the object file based on respective code block identifiers and respective identifiers of jump relationships, to generate a testing result of testing the to-be-tested code file.

In some optional implementation manners of this embodiment, the testing unit 604 may further be configured for performing concolic execution to the instrumented intermediate code file based on respective code block identifiers and respective identifiers of jump relationships, to generate a testing result of testing the to-be-tested code file.

In some optional implementation manners of this embodiment, the compiling unit 601 may further be configured for compiling a to-be-tested code file to obtain an intermediate code file including a second instrumentation content, wherein the second instrumentation content includes an error detection statement and a location labeled statement for indicating a location of the error detection statement.

In some optional implementation manners of this embodiment, the testing unit 604 may comprise: a generating and creating module 6041 configured for generating a set of test cases, and creating an empty set of testing process information; a testing module 6042 configured for executing a first testing operation that comprises: performing, with a test case in the set of test cases as input, grey box fuzz testing to the object file in response to determining that a preset switch condition is not satisfied; generating testing process information based on the test case used in the grey box fuzz testing process, the identifiers of the jump relationships accessed in the grey box fuzz testing process, and the error access identifier corresponding to the grey box fuzz testing process, wherein the error access identifier corresponding to the grey box fuzz testing process is configured for characterizing whether the grey box fuzz testing process has accessed the error detection statement; and adding the testing process information as generated to the set of testing process information.

In some optional implementation manners of this embodiment, the first testing operation may further comprise: deleting the test case used in the grey box fuzz testing process from the set of test cases.

In some optional implementation manners of this embodiment, the first testing operation may further comprise: in response to determining that the preset switch condition is satisfied, performing a second testing operation that comprises: generating a set of candidate test cases using a candidate test case, wherein the candidate test case refers to a test case in a testing process information in the set of testing process information, wherein, the error access identifier of the testing process information is yes and/or the identifiers of the jump relationships accessed of the testing process information is not empty; performing, using the candidate test case in the set of candidate test cases, concolic execution to the instrumented intermediate code file, to generate a complementary test case that an execution path of the complementary test case is complementary to an execution path of the inputted candidate test case; adding the complementary test case as generated to the set of test cases; and continuing executing the first testing operation.

In some optional implementation manners of this embodiment, the first testing operation may further comprise: taking a result of performing grey box fuzz testing to the object file as a testing result of testing the to-be-tested code file in response to determining that a preset end condition is satisfied.

In some optional implementation manners of this embodiment, the second testing operation may further comprise: before continuing executing the first testing operation, deleting the candidate test case used during the concolic execution from the set of candidate test cases.

It needs to be noted that the implementation details and technical effects of respective units in the apparatus for testing a code file as provided according to the embodiments of the present disclosure may refer to the depictions in other embodiments of the present disclosure, which will not be detailed here.

Figure 7:
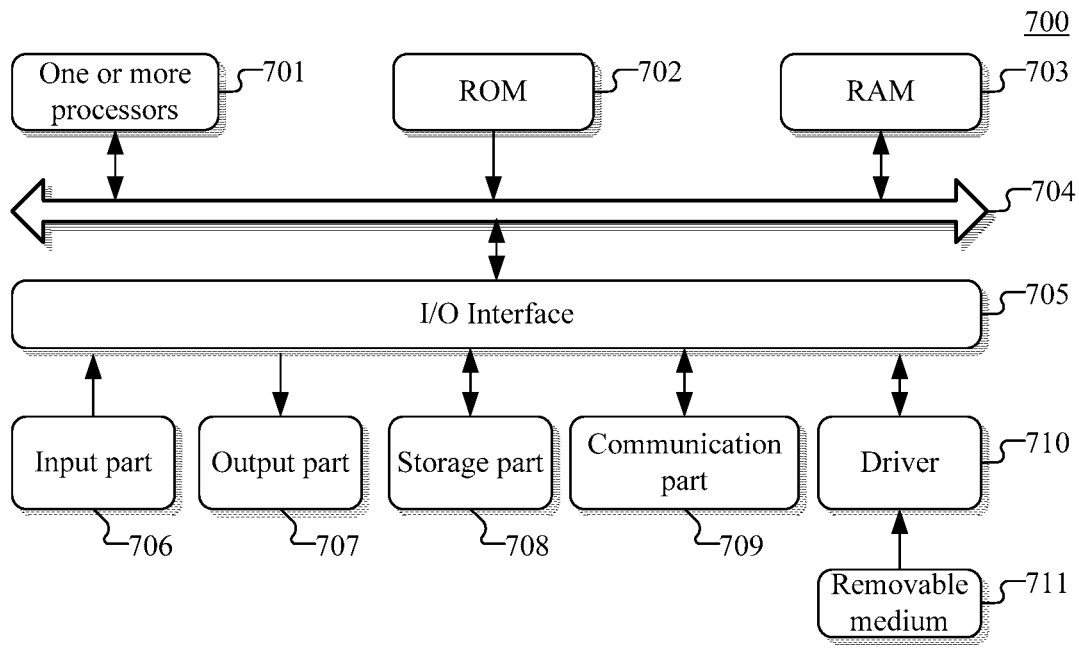
FIG. 7 is a structural schematic diagram of a computer system of a terminal device or a server adapted for implementing the embodiments of the present disclosure.

Now, refer to FIG. 7, which shows a structural schematic diagram of a computer system 700 of a terminal device or a server, which is adapted for implementing the embodiments of the present disclosure. The computer system shown in FIG. 7 is only an example, which should not bring any limitation to the functions and use scopes of the embodiments of the present disclosure.

As shown in FIG. 7, the computer system 700 comprises one or more processors 701 which may perform various kinds of appropriate actions and processing based on computer program stored in a read-only memory (ROM) 702 or computer program loaded into the random-access memory (RAM) 703 from a memory part 708. In RAM 703, there may also store various kinds of programs and data needed for operations of the system 700. One or more processors 701, ROM 702, and RAM 703 are connected with each other via a bus 704. The input/output (I/O) interface 705 may also be connected to the bus 704.

A plurality of components are connected to the I/O interface 705, comprising: an input part 706 including a keyboard, a mouse, and etc.; an output part 707 including such as a CRT (Cathode Ray Tube), an LCD (Liquid Crystal Display), and a loudspeaker, etc.; a memory part 708 including a hard disk, etc.; and a communication part 709 including a network interface card such as a LAN (Local Area Network) card, a modem, etc. The communication part 709 performs communication processing via a network such as the Internet. A driver 710 is also connected to the I/O interface 705 as needed. A removable medium 711, such as a magnetic disk, an optical disk, a magneto-optical disk, and a semiconductor memory, etc., is mounted on the driver 710 as needed, so as to facilitate the computer program read therefrom to be installed in the memory part 708.

Particularly, according to the embodiments of the present disclosure, the processes described above with reference to the flow diagrams may be implemented as computer software programs. For example, an embodiment of the present disclosure includes a computer program product that has a computer program carried on a computer-readable medium, the computer program containing computer codes for executing the methods shown in the flow diagrams. In such an embodiment, the computer programs may be downloaded and installed from a network through the communication part 709 and/or installed from the removable medium 711. When being executed by the one or more processors 701, the computer programs execute the functions limited in the methods of the present disclosure. It needs to be noted that the computer readable medium as described in the present disclosure may be a computer-readable signal medium or a computer-readable storage medium or any combination thereof. The computer-readable storage medium, for example, may be, but not limited to, an electrical, magnetic, optical, electromagnetic, infrared, or semiconductor system, apparatus or device, or any combination thereof. More specific examples of the computer-readable storage medium may include, but not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof. In the present disclosure, the computer-readable storage medium may be any tangible medium containing or storing a program that may be used by an instruction executing system, apparatus, or device or used in combination therewith. Further, in the present disclosure, the computer-readable signal medium may include a data signal propagated in a baseband or as part of a carrier, in which computer-readable program code are carried. A data signal propagated in such a way may assume a plurality of forms, including, but not limited to, an electromagnetic signal, an optical signal, or any appropriate combination thereof. The computer-readable signal medium may also be any computer-readable medium other than the computer-readable storage medium, which computer-readable medium may send, propagate or transmit the programs used by the instruction executing system, apparatus or device or used in combination therewith. The program code embodied on the computer-readable medium may be transmitted using any appropriate medium, including, but not limited to: wireless, wired, cable, RF, etc., or any appropriate combination thereof.

One or more programming languages or a combination thereof may be used to compile the computer program codes for executing the operations in the present disclosure. The programming languages include object-oriented programming languages (such as Java, Smalltalk, C++), and also include conventional procedural programming languages (such as "C" language or similar programming languages). The program code may be completely executed on a user computer, partially executed on the user computer, executed as an independent software packet, or partially executed on the user computer while partially executed on the remote computer, or completely executed on the remote computer or the server. In a scene associated with a remote computer, the remote computer may be connected to the user computer via any kind of network (including a local area network (LAN) or a wide area network (WAN), or may be connected to the external computer (for example, connected via the Internet through an Internet Service Provider).

The flow diagrams and block diagrams in the drawings illustrate system architectures, functions, and operations possibly implemented by the system, method, and computer program product of various embodiments of the present disclosure. At this point, each block in the flow diagrams or block diagrams may represent a module, a program segment, or part of codes, wherein the module, program segment, or part of codes contain one or more executable instructions for implementing a prescribed logic function. It should also be noted that in some alternative implementations, the functions annotated in the blocks may also occur in a sequence different from what is indicated in the drawings. For example, two successively expressed blocks actually may be executed substantially in parallel, and they may be sometimes executed in a reverse order, dependent on the functions involved. It should also be noted that each block in the block diagrams and/or flow diagrams and a combination of blocks in the block diagrams and/or flow diagrams may be implemented by a specific hardware-based system for executing a prescribed function or operation, or may be implemented by a combination of specific hardware and computer instructions.

The units mentioned in the description of the embodiments of the present disclosure may be implemented in a software manner or in a hardware manner. The described units may be disposed in a processor, for example may be described as: a processor comprising a compiling unit, an instrumenting unit, a determining unit, and a testing unit. Particularly, names of these units do not constitute limitations to those units. For example, the compiling unit may also be described as "a unit for compiling a to-be-tested file and obtaining an intermediate code file".

In another aspect, the present disclosure further provides a computer-readable medium; the computer-readable medium may be included in the apparatus described in the embodiments; or may be separately provided, without being installed in the apparatus. The computer-readable medium carries one or more programs that, when being executed by the apparatus, cause the apparatus to: compile a to-be-tested code file to obtain an intermediate code file; instrument a first instrumentation content to the intermediate code file, wherein the first instrumentation content includes a code block identifier of each code block in the intermediate code file; determine an identifier of a jump relationship between two code blocks that have the jump relationship in the intermediate code file based on respective code block identifiers in the intermediate code file; perform dynamic testing to the instrumented intermediate code file based on respective code block identifiers and respective identifiers of jump relationships, to generate a testing result of testing the to-be-tested code file.

What have been described above are only preferred embodiments of the present disclosure and an illustration of the technical principle as exerted. Those skilled in the art should understand, the scope of invention in the present disclosure is not limited to the technical solution resulting from a specific combination of the technical features, and meanwhile, should also cover other technical solutions resulting from any combination of the technical features or their equivalent features without departing from the inventive concept. For example, a technical solution resulting from mutual substitution of the features and those technical features disclosed (not limited to) in the present disclosure with similar functions.

What is claimed is:

1. A method for testing a code file, comprising:
compiling a to-be-tested code file to obtain an intermediate code file, the intermediate code file comprising at least one code block and a second instrumentation content, wherein the second instrumentation content includes an error detection statement and a location labeled statement for indicating a location of the error detection statement;
instrumenting a first instrumentation content into the intermediate code file, wherein the first instrumentation content includes a code block identifier of each code block in the intermediate code file;
determining an identifier of a jump relationship between two code blocks that have the jump relationship in the intermediate code file based on respective code block identifiers in the intermediate code file, comprising:
parse the intermediate code file, and determine that the two code blocks have the jump relationship in the intermediate code file when there is an execution path for jumping from an execution of a first code block in the two code blocks and a conditional statement to an execution of a second code block in the two code blocks; and
performing dynamic testing to the instrumented intermediate code file based on respective code block identifiers and respective identifiers of jump relationships between code blocks, to generate a testing result of testing the to-be-tested code file, comprising:
compiling the instrumented intermediate code file to obtain an object file corresponding to the instrumented intermediate code file; and
performing grey box fuzz testing to the obtained object file and performing concolic execution to the instrumented intermediate code file to generate the testing result of testing the to-be-tested code file, comprising a second testing operation that comprises:
using a candidate test case used in grey box fuzz testing of the obtained object file as an input for concolic execution of the instrument intermediate code file, the candidate test case comprises a test case in a testing process information, wherein an error access identifier of the testing process information is yes or identifiers of accessed jump relationships of the testing process information are not empty, or the error access identifier of the testing process information is yes and the identifiers of the accessed jump relationships of the testing process information are not empty; performing, using the candidate test case, concolic execution to the instrumented intermediate code file to generate a complementary test case, wherein the error access identifier corresponding to the grey box fuzz testing process characterizes whether the grey box fuzz testing process has accessed the error detection statement; and
using the obtained complementary test case as an input for the grey box fuzz testing of the obtained object file to generate the testing result of testing the to-be-tested code file.

2. The method according to claim 1, wherein the step of performing dynamic testing to the instrumented intermediate code file based on respective code block identifiers and respective identifiers of jump relationships, to generate a testing result of testing the to-be-tested code file, comprises:
compiling the instrumented intermediate code file to obtain an object file corresponding to the instrumented intermediate code file;
performing grey box fuzz testing to the object file based on respective code block identifiers and respective identifiers of jump relationships, to generate a testing result of testing the to-be-tested code file.

3. The method according to claim 1, wherein the step of performing dynamic testing to the instrumented intermediate code file based on respective code block identifiers and respective identifiers of jump relationships, to generate a testing result of testing the to-be-tested code file, comprises:
performing concolic execution to the instrumented intermediate code file based on respective code block identifiers and respective identifiers of jump relationships, to generate a testing result of testing the to-be-tested code file.

4. The method according to claim 1,
wherein the step of alternately performing grey box fuzz testing to the object file and performing concolic execution to the instrumented intermediate code file based on respective code block identifiers and respective identifiers of jump relationships, to generate a testing result of testing the to-be-tested code file, comprises:
generating a set of test cases, and creating an empty set of testing process information; and executing a first testing operation that comprises:
performing, with a test case in the set of test cases as input, grey box fuzz testing to the object file in response to determining that a preset switch condition is not satisfied;
generating the testing process information, based on the test case used in the grey box fuzz testing process, the identifiers of the jump relationships accessed in the grey box fuzz testing process, and the error access identifier corresponding to the grey box fuzz testing process; and
adding the testing process information as generated to the set of testing process information.

5. The method according to claim 4, wherein the first testing operation further comprises:
deleting the test case used in the grey box fuzz testing process from the set of test cases.

6. The method according to claim 1, wherein the method further comprises:
in response to determining that a preset switch condition is satisfied, performing the second testing operation, wherein the second testing operation further comprises:
generating a set of candidate test cases using the candidate test case;
performing, using the candidate test case in the set of candidate test cases, concolic execution to the instrumented intermediate code file, to generate the complementary test case that an execution path of the complementary test case is complementary to an execution path of the inputted candidate test case;
adding the complementary test case as generated to the set of candidate test cases; and
continuing to perform the grey box fuzz testing to the obtained object file by using the obtained complementary test case as an input.

7. The method according to claim 6, wherein, the second testing operation further comprises: before continuing to perform the grey box fuzz testing to the obtained object file by using the obtained complementary test case as an input, deleting the candidate test case used during the concolic execution from the set of candidate test cases.

8. The method according to claim 1, wherein the method further comprises:
taking a result of performing grey box fuzz testing to the object file as a testing result of testing the to-be-tested code file in response to determining that a preset end condition is satisfied.

9. The method according to claim 1, wherein the code block identifier of the each code block is instrumented to a preset location of the each code block.

10. An electronic device, comprising:
an interface;
a memory on which a computer program is stored; and
one or more processors operably coupled to the interface and the memory, wherein the one or more processors function to:
compile a to-be-tested code file to obtain an intermediate code file, the intermediate code file comprising at least one code block and a second instrumentation content, wherein the second instrumentation content includes an error detection statement and a location labeled statement for indicating a location of the error detection statement;
instrument a first instrumentation content into the intermediate code file, wherein the first instrumentation content includes a code block identifier of each code block in the intermediate code file;
determine an identifier of a jump relationship between two code blocks that have the jump relationship in the intermediate code file based on respective code block identifiers in the intermediate code file, comprising:
parse the intermediate code file, and determine that the two code blocks have the jump relationship in the intermediate code file when there is an execution path for jumping from an execution of a first code block in the two code blocks and a conditional statement to an execution of a second code block in the two code blocks; and
perform dynamic testing to the instrumented intermediate code file based on respective code block identifiers and respective identifiers of jump relationships between code blocks, to generate a testing result of testing the to-be-tested code file, comprising:
compiling the instrumented intermediate code file to obtain an object file corresponding to the instrumented intermediate code file; and
performing grey box fuzz testing to the obtained object file and performing concolic execution to the instrumented intermediate code file to generate the testing result of testing the to-be-tested code file, comprising a second testing operation that comprises:
using a candidate test case used in grey box fuzz testing of the obtained object file as an input for concolic execution of the instrument intermediate code file, the candidate test case comprises a test case in a testing process information, wherein an error access identifier of the testing process information is yes or identifiers of accessed jump relationships of the testing process information are not empty, or the error access identifier of the testing process information is yes and the identifiers of the accessed jump relationships of the testing process information are not empty; performing, using the candidate test case, concolic execution to the instrumented intermediate code file to generate a complementary test case, wherein the error access identifier corresponding to the grey box fuzz testing process characterizes whether the grey box fuzz testing process has accessed the error detection statement; and
using the obtained complementary test case as an input for the grey box fuzz testing of the obtained object file to generate the testing result of testing the to-be-tested code file.

11. A non-transitory computer-readable medium on which a computer program is stored, wherein the computer program, when being executed by or more processors, cause the one or more processors to:
compile a to-be-tested code file to obtain an intermediate code file, the intermediate code file comprising at least one code block and a second instrumentation content, wherein the second instrumentation content includes an error detection statement and a location labeled statement for indicating a location of the error detection statement;
instrument a first instrumentation content to the intermediate code file, wherein the first instrumentation content includes a code block identifier of each code block in the intermediate code file;
determine an identifier of a jump relationship between two code blocks that have the jump relationship in the intermediate code file based on respective code block identifiers in the intermediate code file, comprising:
parse the intermediate code file, and determine that the two code blocks have the jump relationship in the intermediate code file when there is an execution path for jumping from an execution of a first code block in the two code blocks and a conditional statement to an execution of a second code block in the two code blocks; and
perform dynamic testing to the instrumented intermediate code file based on respective code block identifiers and respective identifiers of jump relationships between code blocks, to generate a testing result of testing the to-be-tested code file, comprising:
compiling the instrumented intermediate code file to obtain an object file corresponding to the instrumented intermediate code file; and
performing grey box fuzz testing to the obtained object file and performing concolic execution to the instrumented intermediate code file to generate the testing result of testing the to-be-tested code file, comprising a second testing operation that comprises:
using a candidate test case used in grey box fuzz testing of the obtained object file as an input for concolic execution of the instrument intermediate code file, the candidate test case comprises a test case in a testing process information, wherein an error access identifier of the testing process information is yes or identifiers of accessed jump relationships of the testing process information are not empty, or the error access identifier of the testing process information is yes and the identifiers of the accessed jump relationships of the testing process information are not empty; performing, using the candidate test case, concolic execution to the instrumented intermediate code file to generate a complementary test case, wherein the error access identifier corresponding to the grey box fuzz testing process characterizes whether the grey box fuzz testing process has accessed the error detection statement; and
using the obtained complementary test case as an input for the grey box fuzz testing of the obtained object file to generate the testing result of testing the to-be-tested code file.

* * * * *